US012699388B2

(12) United States Patent
Hu et al.

(10) Patent No.: US 12,699,388 B2

(45) Date of Patent: Aug. 4, 2026

(54) VIRTUAL ESP MODEL TO DETECT SYSTEM DEGRADATION FOR PREVENTIVE MAINTENANCE

(71) Applicant: Halliburton Energy Services, Inc., Houston, TX (US)

(72) Inventors: Yuzhu Hu, Tulsa, OK (US); Frank Corredor, Houston, TX (US); Clara Susana Tandazo Castro, Houston, TX (US); Hans Sjerps, Amsterdam (NL); Juan Pablo Atencia Alvarez, Bogota (CO); Xunlez Alexis Nunez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 565 days.

(21) Appl. No.: 18/336,113

(22) Filed: Jun. 16, 2023

(65) Prior Publication Data

US 2024/0419165 A1     Dec. 19, 2024

(51) Int. Cl.
*G05B 23/02* (2006.01)

(52) U.S. Cl.
CPC ..... *G05B 23/0283* (2013.01); *G05B 23/0208* (2013.01); *G05B 23/024* (2013.01)

(58) Field of Classification Search
CPC ............ G05B 23/0283; G05B 23/0208; G05B 23/024
See application file for complete search history.

(56) References Cited

U.S. PATENT DOCUMENTS

| | | | |
|---|---|---|---|
| 6,937,923 | B1 | 8/2005 | Bassett |
| 11,236,751 | B2 | 2/2022 | Nguyen et al. |
| 11,609,353 | B2 | 3/2023 | Jain et al. |

(Continued)

FOREIGN PATENT DOCUMENTS

| | | |
|---|---|---|
| CN | 108756817 | 11/2018 |
| EP | 4649225 | 11/2025 |

(Continued)

OTHER PUBLICATIONS

Sun et al., "Preventing Wellbore Collapse with AI-Powered Cuttings Monitoring: a Field-Validated Approach to Enhance Drilling Decision-Making", Jan. 13, 2026, Paper presented at the IPTC Summit on AI for the Energy Industry, Paper No. IPTC-25154-MS https://doi.org/10.2523/IP, pp. 1-11 (Year: 2026).*

(Continued)

*Primary Examiner* — Mi'schita' Henson

(74) *Attorney, Agent, or Firm* — DeLizio, Peacock, Lewin & Guerra LLP

(57)     ABSTRACT

A method comprises selecting at least one wellbore variable of a wellbore operation and for each of two or more machine learning models, training each respective machine learning model with a respective set of training data values of the at least one wellbore variable detected in a respective different time interval. The method comprises for each of the two or more machine learning models, processing, for each of the at least one wellbore variable, a set of data samples of the respective at least one wellbore variable using each of the two or more trained machine learning models to output a respective model output response for each data sample of a set of data samples.

28 Claims, 7 Drawing Sheets

(56) References Cited

U.S. PATENT DOCUMENTS

| | | | |
|---|---|---|---|
| 11,947,069 B2 * | 4/2024 | Tang | E21B 49/00 |
| 12,242,260 B2 | 3/2025 | Gandikota et al. | |
| 12,385,388 B2 | 8/2025 | Kanfar et al. | |
| 2005/0173112 A1 | 8/2005 | Kavaklioglu et al. | |
| 2007/0183902 A1 | 8/2007 | Stiles, Jr. et al. | |
| 2011/0106452 A1 | 5/2011 | Anderson et al. | |
| 2013/0151156 A1 | 6/2013 | Noui-Mehidi et al. | |
| 2019/0345797 A1 | 11/2019 | Babic | |
| 2022/0090485 A1 | 3/2022 | Boguslawski et al. | |
| 2022/0098971 A1 | 3/2022 | Raglin et al. | |
| 2022/0221826 A1 | 7/2022 | Nguyen et al. | |
| 2023/0107580 A1 | 4/2023 | Gandikota et al. | |
| 2023/0186627 A1 | 6/2023 | Shao et al. | |
| 2023/0235646 A1 | 7/2023 | Wang | |
| 2024/0093596 A1 | 3/2024 | Kanfar et al. | |
| 2024/0110473 A1 | 4/2024 | Hu et al. | |
| 2024/0169252 A1 | 5/2024 | Harrington et al. | |
| 2024/0328302 A1 | 10/2024 | Hu et al. | |
| 2025/0259114 A1 * | 8/2025 | Jandhyala | G06N 5/022 |
| 2026/0085602 A1 * | 3/2026 | Oehlbeck | E21B 44/00 |

FOREIGN PATENT DOCUMENTS

| | | |
|---|---|---|
| KR | 101160678 | 6/2012 |
| WO | 2021155272 | 8/2021 |
| WO | 2021252416 | 12/2021 |
| WO | 2023009741 | 2/2023 |
| WO | 2023056120 | 4/2023 |
| WO | 2024205647 | 10/2024 |

OTHER PUBLICATIONS

"PCT Application No. PCT/US2023/068689, International Search Report and Written Opinion", Mar. 6, 2024, 10 pages.

"PCT Application No. PCT/US2023/065293, International Search Report and Written Opinion", Dec. 20, 2023, 16 pages.

"PCT Application No. PCT/US2023/027253 International Search Report and Written Opinion", Nov. 7, 2023, 8 pages.

Ahmed, et al., "Automatic Well Testing and PIP Calculations Using Smart Rod Pump Controllers", Feb. 20, 2012, 14 pages.

El-Saghier, et al., "A model for calculating bottom-hole pressure from simple surface data in pumped wells", Feb. 24, 2020, 9 pages.

Xian, et al., "A New Method of Bhp Measurement in Esp Deadhead Test", Mar. 25, 2014, 9 pages.

"U.S. Appl. No. 18/193,415 Non-Final Office Action", Oct. 30, 2024, 9 pages.

"U.S. Appl. No. 17/961,750 Non-Final Office Action", Nov. 24, 2025, 10 pages.

* cited by examiner

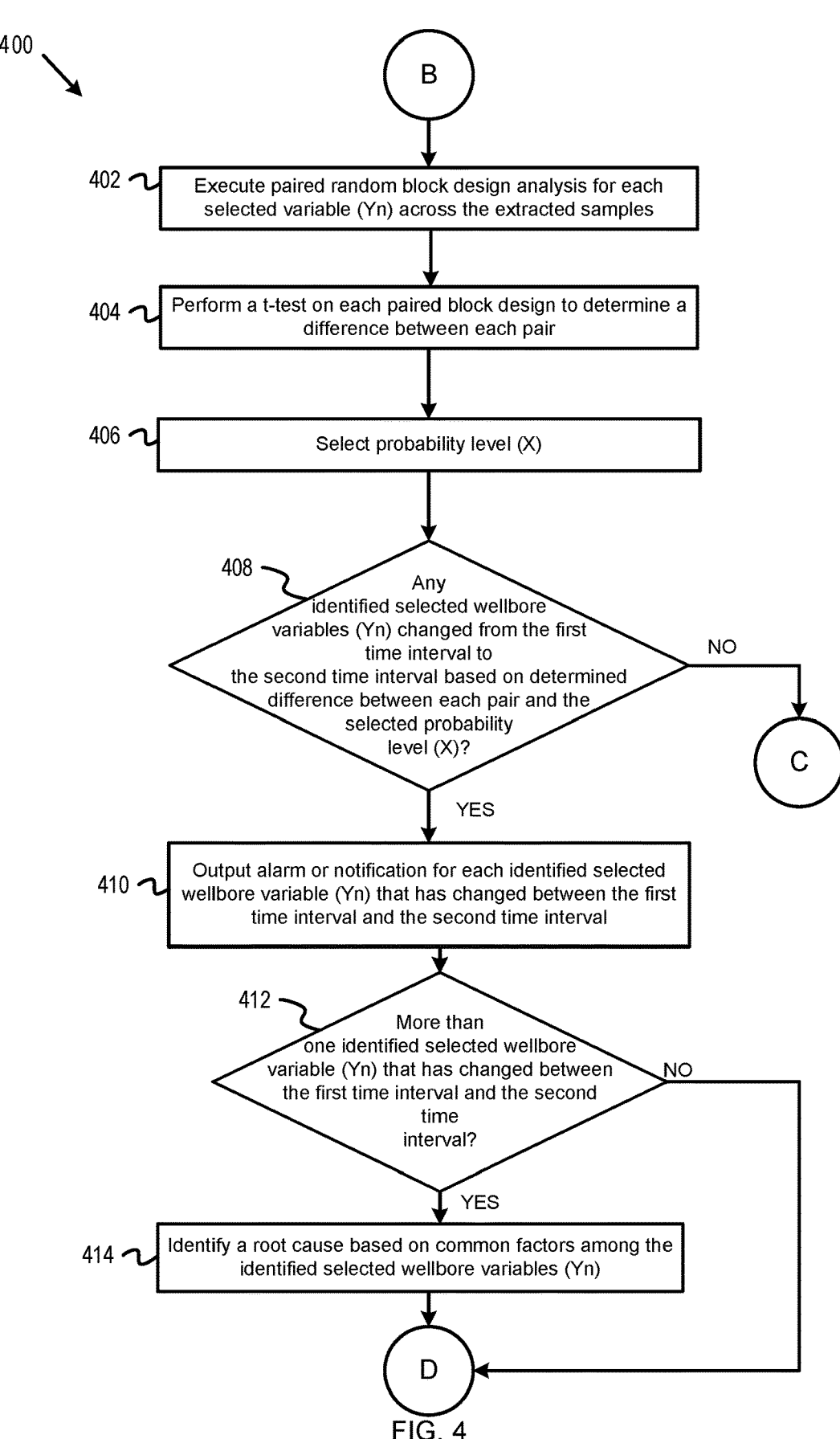

402 — Execute paired random block design analysis for each selected variable (Yn) across the extracted samples 404 — Perform a t-test on each paired block design to determine a difference between each pair 406 — Select probability level (X)

408 — Any identified selected wellbore variables (Yn) changed from the first time interval to the second time interval based on determined difference between each pair and the selected probability level (X)?

NO

C

YES

410 — Output alarm or notification for each identified selected wellbore variable (Yn) that has changed between the first time interval and the second time interval 412 — More than one identified selected wellbore variable (Yn) that has changed between the first time interval and the second time interval?

NO

YES

414 — Identify a root cause based on common factors among the identified selected wellbore variables (Yn)

| SAMPLE 602 | 1ST TRAINED MACHINE LEARNING MODEL RESPONSE FOR $Y_N$ 604 | 2ND TRAINED MACHINE LEARNING MODEL RESPONSE FOR $Y_N$ 606 | Δ 608 |
|---|---|---|---|
| 1 | 5 | 4 | 1 |
| 2 | 6 | 2 | 4 |
| 3 | 7 | 5 | 2 |
| 4 | 8 | 5 | 3 |

700

VIRTUAL ESP MODEL TO DETECT SYSTEM DEGRADATION FOR PREVENTIVE MAINTENANCE

BACKGROUND

For different wellbore operations (such as Electrical Submersible Pumping (ESP)), it may be difficult to identify changes in the system condition by visually monitoring a parameter. For example in an ESP operation, a motor could be running between 45-50 Hertz (Hz) frequency during a first month with 1000 barrels per day (bpd) flow rate, then the second month, frequency range increased to 50-60 Hz with flow rate of 2000 bpd. By visual inspection with individual parameters, a conclusion might be mistakenly reached that the system condition has been changed. The dynamic changing operating condition might change the plot of each individual parameter monitoring plot, but it might not represent a change in the system.

BRIEF DESCRIPTION OF THE DRAWINGS

Embodiments of the disclosure may be better understood by referencing the accompanying drawings.

Figure 1:
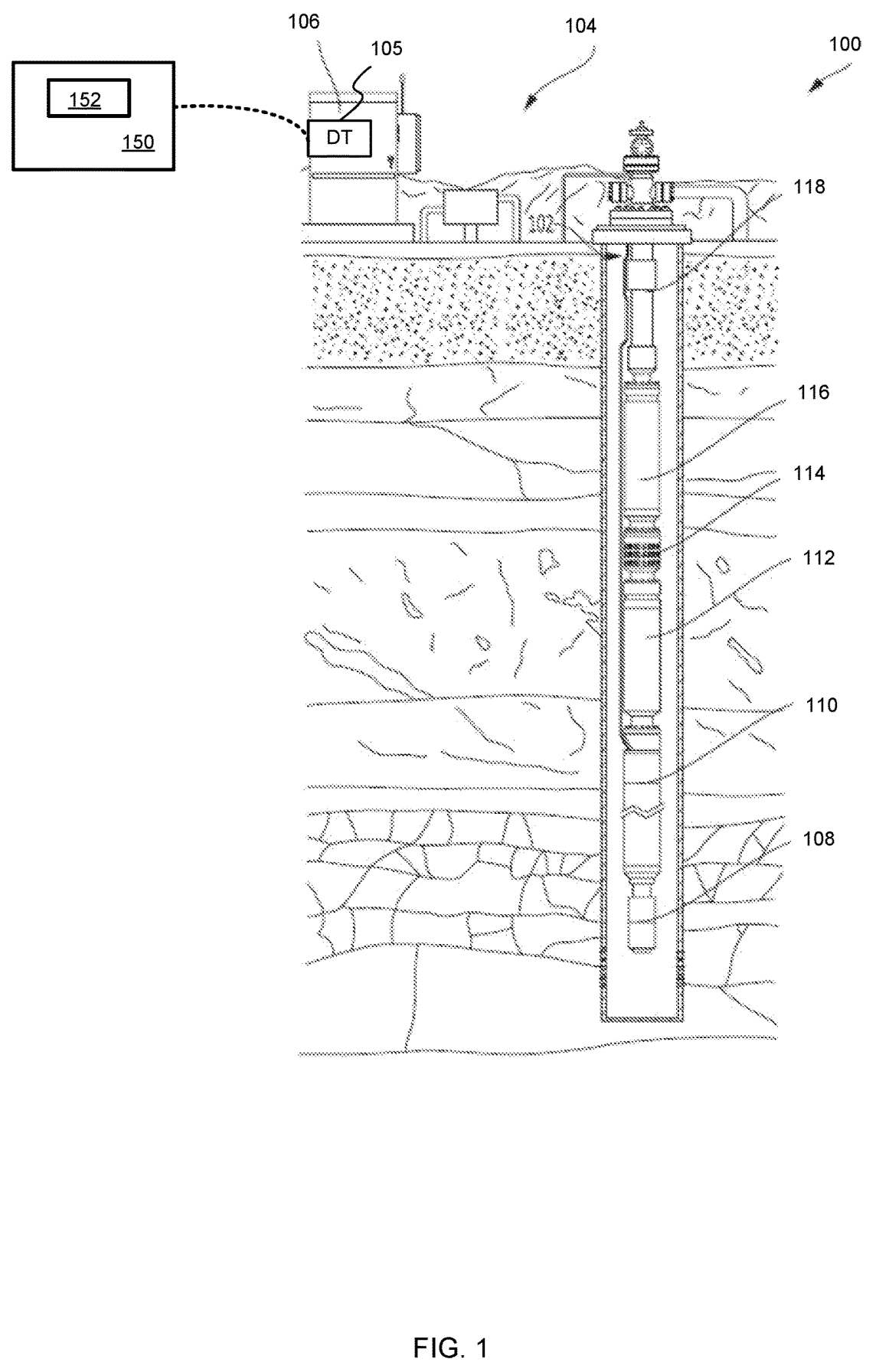

FIG. 1 is an elevation view in partial cross section of an example well system having an electrical submersible pump (ESP) for event detection during wellbore operations, according to some embodiments.

FIGS. 2-5 is a flowchart of example operations for event detection during wellbore operations, according to some embodiments.

DESCRIPTION

Figure 2:
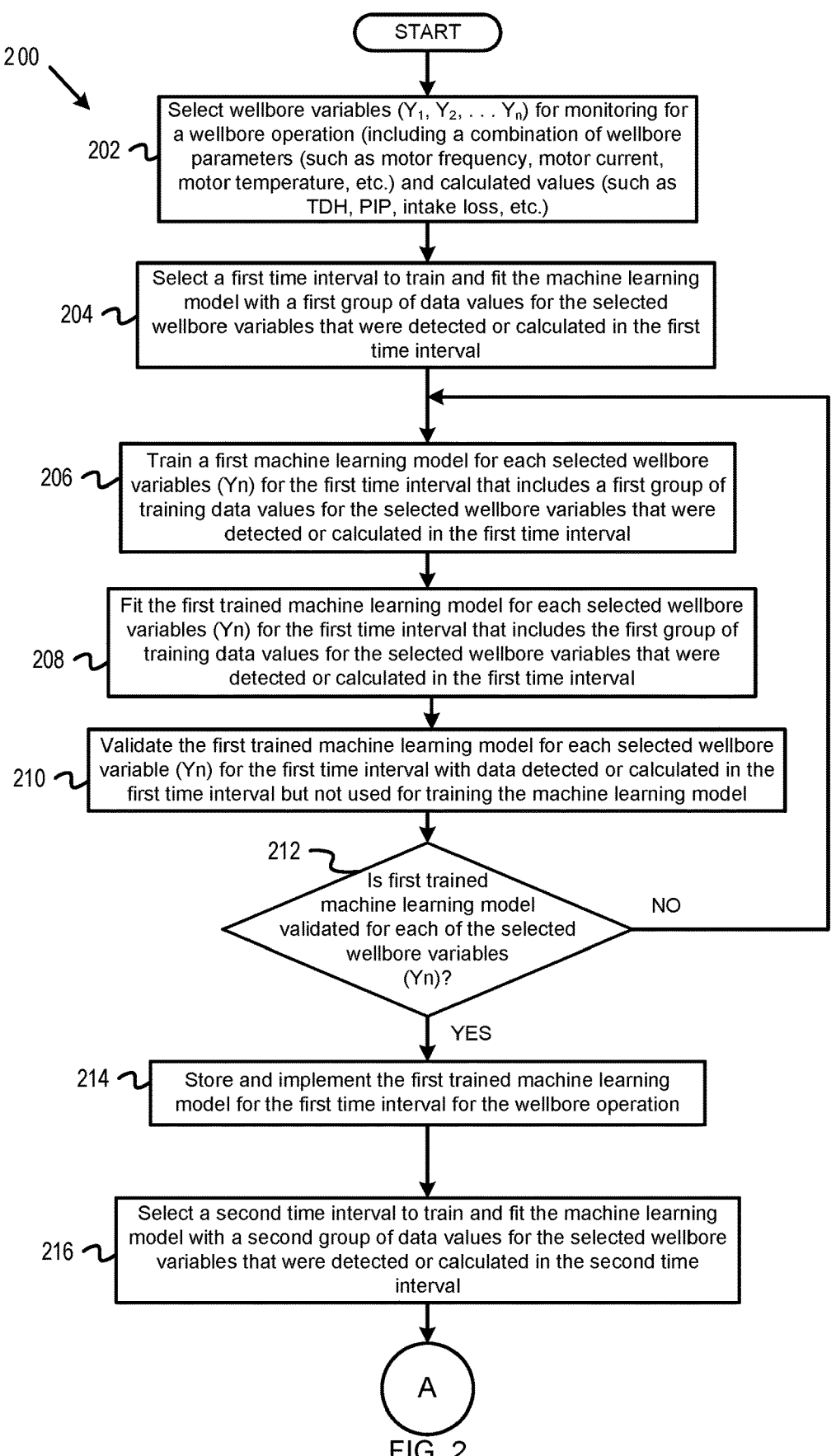
Figure 3:
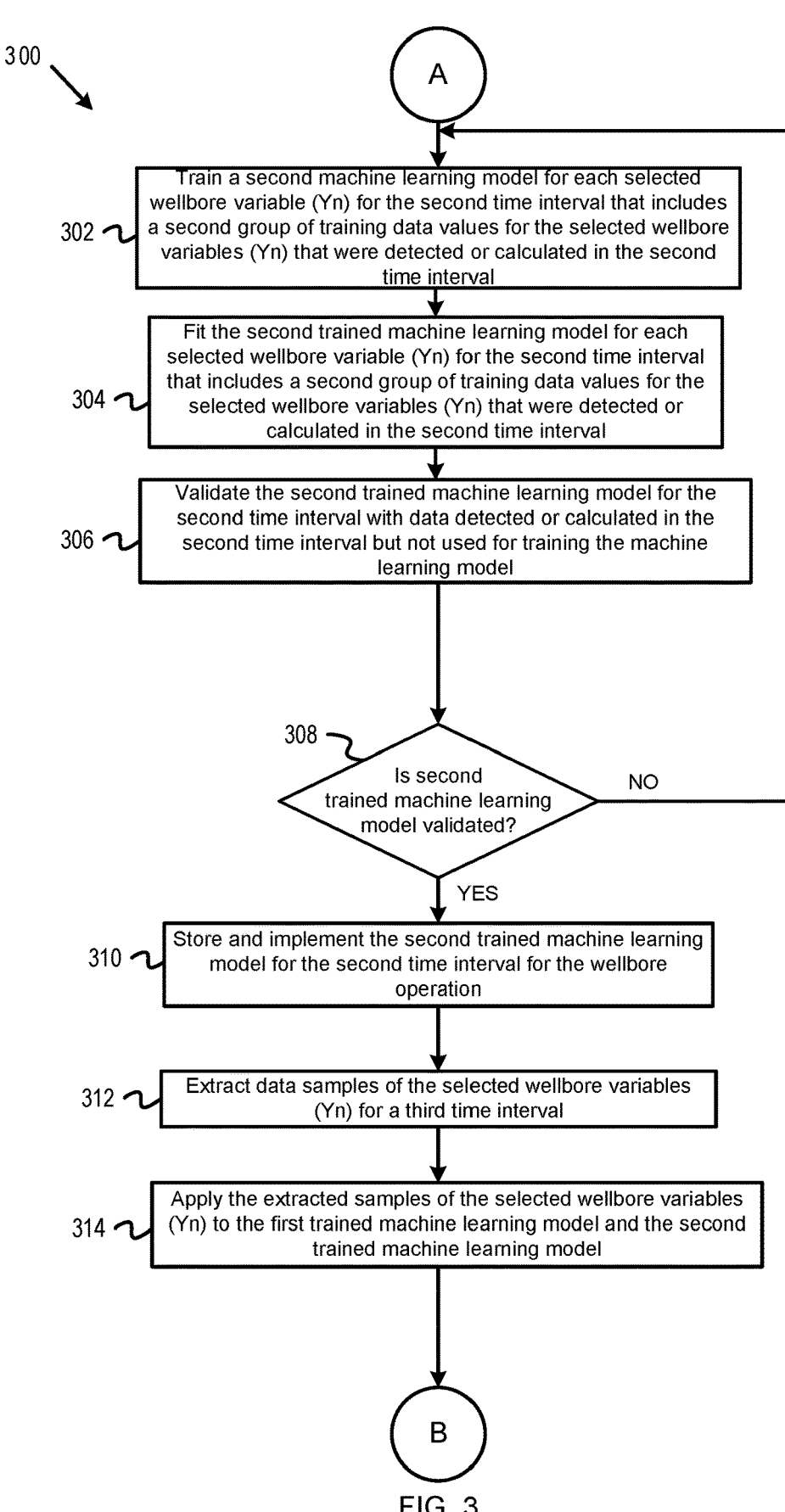
Figure 5:
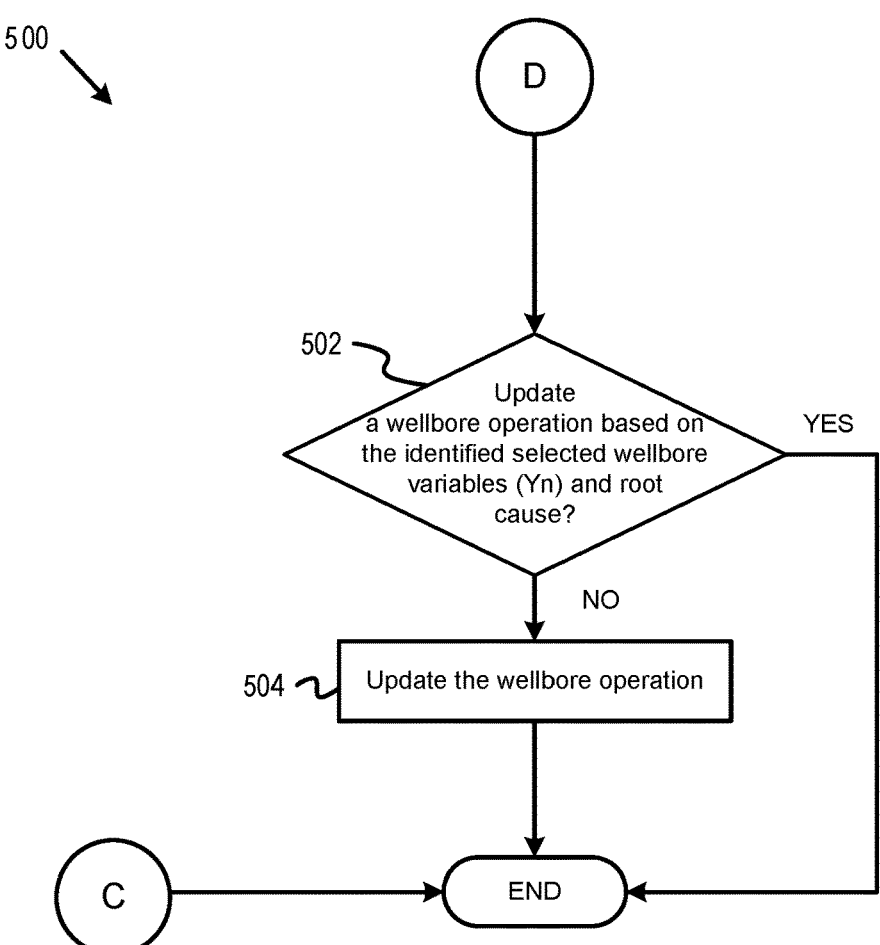

The description that follows includes example systems, methods, techniques, and program flows that embody aspects of the disclosure. However, it is understood that this disclosure may be practiced without these specific details. In some instances, well-known instruction instances, protocols, structures, and techniques have not been shown in detail in order not to obfuscate the description.

Example embodiments may include a statistical machine learning process to monitor and inspect the deviation comprehensively with multiple wellbore variables of a wellbore operation (e.g., electric submersible pump (ESP) operation). Additionally, conclusions may be drawn based on the findings from multiple established or trained machine learning models.

With dynamic changing conditions in a wellbore operation, it may be difficult to visualize and detect the changes or failures. Some implementations may include multiple iterations of a statistical learning process for multiple wellbore variables of a wellbore operation at different time intervals to train multiple machine learning models. These multiple trained machine learning models based on different data from different time intervals may be scaled and arranged into a paired random block design analysis for further comparison.

The resulting output from the paired random block design analysis may be used to identify which wellbore variable(s) have changed between a first time interval and a second time interval. An alarm or notification may be triggered for the wellbore variable(s) that have changed. In some implementations, if multiple wellbore variables have changed between the first time interval and the second time interval, a root cause that may be common across the multiple wellbore variables may be identified. For example, assume that wellbore variable X and wellbore variable Y are considered changed between the first time interval and the second time interval. Also assume that wellbore variable X are derived from directly measured wellbore parameters A, B, and C and that wellbore variable Y are derived from directly measured wellbore parameters C. D, and E. In this example, the root cause would be the common attribute between the two wellbore variable X and Y, which is C. For instance, C might be a frequency of a motor for an ESP operation. In some implementations, actual wellbore operations may be modified or changed based on the identified wellbore parameter(s) that have changed or the identified root cause. For example, the frequency of the motor may be adjusted for an actual wellbore operation.

Thus, example implementations may provide an innovative and comprehensive approach to identify change in a wellbore operation by evaluating multiple wellbore variable. Such example implementations may be especially useful when operating conditions are changing frequently. Also, some example embodiments may allow a determination to be made of whether a change has occurred based on multiple variables (not limited to individual variables). Additionally, even though the wellbore operating conditions may be completely different from the first time interval to the second time interval, example embodiments may still be able to evaluate if there is truly a change, degradation, or a failure involved from the first time interval to the second time interval.

In some implementations, assuming the first time interval is prior to a failure event but the failure event occurred during the second time interval, the root cause may be identified by comparing processing using the two machine learning models without involving all samples of raw data. Also, this determining of the root cause may be used to establish a statistical failure signature. Additionally, this dynamic training of the machine learning models may enable a better understanding of a valid duration of the trained machine learning models for a specific wellbore. Also, example implementations may be based on comparison between two trained machine learning models (not necessarily having to rely on the raw data after the model is trained). Accordingly, it may be possible to implement the analysis even after a failure occurs. For example, such analysis may be performed during a post tear down inspection or a reliability study.

Thus, example implementations do not require real time event detection of a wellbore operation as part of training machine learning models. Additionally, example implementations do not rely on past events that occurred in a wellbore operation to predict a future event based on a machine learning model. In contrast, example implementations may train two different machine learning models with data from two different time intervals to be able to detect if an actual change has occurred for at least one wellbore variable between the two different time intervals. Also, example embodiments may use the two different trained machine learning models to detect that degradation of a part or equipment has occurred beyond a degradation threshold based on comparing a difference in the model output response from the first trained machine learning model and the model output response from the second trained machine learning model. Accordingly, example implementations may determine degradation of a part or equipment of the wellbore operation even if the part or equipment continues to be operational. Examples of degradation may include scaling, abrasives, plugging, manufacturing defects, electrical degradation, mechanical degradation, etc. In some implementations, the machine learning models may be used to define a signature pattern for an event that occurred during the wellbore operation. Example embodiments may use the two different trained machine learning models to detect that an event occurred during the wellbore operation based on signature pattern for the event.

In some implementations, a digital twin of a prediction model may be generated. When all sensors are available, all parameters may be trained using a machine learning model and displayed besides the real time data from the sensors (a complete duplicate of machine learning monitor parameters to real time data). After a sensor fails, the missing monitoring parameters may be filled by the machine learning model from the digital twin. In this way, the system may continue to operate based on a hybrid monitoring system involving both real time measurement data and machine learning data. While described such that there is a comparison between two trained machine learning models, in some implementations, there may be a comparison among two or more machine learning models. Also, the comparison may be executed among all the machine learning models at the same time or different times.

Example System

An example system for event detection during a wellbore operation is now described. While the example system relates to an ESP, example implementations may be used in any other type of wellbore operation (such as any type of wellbore operations during production, completion, drilling, etc.). FIG. 1 is an elevation view in partial cross section of an example well system having an electrical submersible pump (ESP) for event detection during wellbore operations, according to some embodiments. A wellbore environment 100 can represent an applicable environment in which a substance may be pumped through the wellbore 102 toward the surface. For example, the wellbore environment 100 may represent a hydrocarbon production environment in which hydrocarbons are pumped through the wellbore 102 toward the surface. In another example, the wellbore environment 100 may represent a geothermal environment in which water may be pumped through the wellbore 102 toward the surface.

The wellbore environment 100 includes a production system 104 disposed in relation to the wellbore 102. The production system 104 may include a surface system 106. The production system 104 also may include components disposed downhole in the wellbore 102. Specifically, the production system 104 may include a gauge 108, a motor 110, a seal section 112, a gas separator 114, an intake 120, a pump 116, and a power cable 118. The components of the production system 104, in combination, may function to form various tasks related to pumping a substance through the wellbore 102 toward the surface. In particular, the surface system 106 may function to control and interact with the various downhole components for performing various tasks related to pumping a substance through the wellbore 102 towards the surface. The surface system 106 may include a dynamic tracker 105 configured to determine pressures, flows, and other properties of the production system 104. Although shown as a part of the surface system 106, the dynamic tracker 105 may reside in any suitable location, such as on any suitable remote computer system accessible via a wired or wireless telecommunications network.

In this example, a computer 150 includes a processor 152 that is communicatively coupled to the surface system 106. The computer 150 may be remote or local to the well environment. In some implementations, the processor 152 may perform the operations depicted in FIGS. 2-5 (which are further described below). For example, the processor 152 may train machine learning models based on wellbore variables and use the trained machine learning models to determine if the wellbore variables have actually changed between two different time intervals of a wellbore operation at the wellbore environment 100.

The gauge 108 may function to generate downhole data of one or more monitored parameters. Specifically, the downhole data may include any suitable data that may be measurable downhole. When a first component or first point is described as being before a second component or second point, the first component or point may be positioned further in a wellbore than a second component or point. For example, the gauge 108 may include a pressure gauge that is configured to identify a wellbore pressure before the pump 116 (such as before the intake or gas separator 114). In some implementations, the gauge 108 supplies wellbore pressure measurements used in determining the required TDH. Hence, in some implementations, the dynamic tracker 105 utilizes a wellbore pressure measurement to determine the required TDH at given time. The determination of required TDH may be used in a method for detecting plugging and/or scaling of the ESP. Such a method also may utilize a value for produced TDH of the ESP in detecting the plugging and/or scaling of the ESP (described in greater detail below).

Additionally, the gauge 108 may function to measure parameters for preventing or reducing formation damage caused by overproduction through the wellbore 102. The gauge 108 may communicate with the surface system 106 in generating downhole data. Specifically, the gauge 108 may provide the downhole data as telemetry data to the surface system 106, where the downhole data may be used in controlling production operation of the production system 104.

The motor 110 functions to drive the pump 116. Specifically, the motor 110 may receive power from the surface through the power cable 118 to drive the pump 116 in lifting production substance towards the surface. The motor 110 may be an applicable motor that may drive the pump 116. Correspondingly, the pump 116 may be an applicable pump that is capable of pumping production substances toward the surface of the wellbore 102, such as an ESP. The seal section 112 is disposed between the motor 110 and the intake of the pump 116. The seal section 112 functions to isolate the motor 110 from downhole fluids. The seal section 112 also may function to equalize pressure in the wellbore 102 with pressure in the motor 110.

The gas separator 114 is positioned between the pump 116 and the sealing section 112 and motor 110 combination. The gas separator 114 may serve, at least in part, as an intake for the pump 116. In particular, the gas separator 114 may function to separate gas from fluid in the wellbore and allow for the entry of the separated fluid into the pump 116. In turn, the pump 116 may pump the separate fluid toward the surface as part of a production substance. The separated fluid that is fed to the pump 116 may include portions of the separated gas that are broken down and incorporated into the fluid to form a more homogenized solution.

Example Operations

Example operations for event detection during wellbore operations are now described. In particular, FIGS. 2-5 is a flowchart of example operations for event detection during wellbore operations, according to some embodiments. Operations of flowcharts 200-500 of FIGS. 2-5 can be performed by software, firmware, hardware, or a combination thereof. Operations of the flowcharts 200-500 continue among each other through transition points A-D. Operations of the flowcharts 200-500 are described in reference to the example system of FIG. 1. Also, in some implementations, one or more of the operations may be performed by a processor (such as a processor of a computer depicted in FIG. 7 (which is further described below). However, other systems and components can be used to perform the operations now described. The operations of the flowchart 200 start at block 202.

At block 202, wellbore variables $(Y_1, Y_2 \ldots Y_n)$ are selected for monitoring for a wellbore operation. (including a combination of wellbore parameters (such as motor frequency, motor current, motor temperature, etc.) and calculated values (such as TDH. PIP, intake loss, etc.). For example, with reference to FIG. 1, the processor 152 may perform this selection. The wellbore variables $(Y_n)$ that are selected may be a combination of measured wellbore parameters (such as motor frequency, motor current, motor temperature, etc.) and calculated values (such as total dynamic head (TDH), pump intake pressure (PIP), intake loss, etc.). These calculated values may be calculated based, at least in part, on one or more measured wellbore parameters. In some implementations, the wellbore variables $(Y_n)$ that are selected may be based on the type of wellbore operation, various statistics of which wellbore variables $(Y_n)$ are critical in determining change, etc. For example, that wellbore variables $(Y_n)$ that are selected may be based on the type of equipment, how long the wellbore operation has currently been running, the type of subsurface formation into which the wellbore is formed, etc.

At block 204, a first time interval is selected to train and fit a first machine learning model with a second group of data values for the selected wellbore variables $(Y_n)$ that were detected or calculated in the first time interval. For example, with reference to FIG. 1, the processor 152 may make this selection. The first time interval may be any time range in which the wellbore operation is running. For instance, the first time interval may be a day, a week, a month, a quarter, a year, etc. The first time interval may include data values for the selected wellbore variables $(Y_n)$ and data values for other wellbore variables. Accordingly, the processor may clean or filter all of the data values for the first time interval to include a subset of the data values associated with the selected wellbore variables $(Y_n)$.

At block 206, a first machine learning model is trained for each selected wellbore variable $(Y_n)$ for the first time interval that includes a first group of training data values for the selected wellbore variables $(Y_n)$ detected or calculated in the first time interval. For example, with reference to FIG. 1, the processor 152 may train a first machine learning model for each selected wellbore variables $(Y_n)$ for the first time interval using a first group of training data values for the selected wellbore variables $(Y_n)$ that were measured or calculated for the first time interval of the wellbore operation using Equation 1:

$$Y_n = f(P_1, \ldots, P_n) \qquad \text{(Eq. 1)}$$

For example, the processor 152 may train the first machine learning model for different values of TDH calculated from measured wellbore parameters measured during the first time interval. The processor 152 may also train the first machine learning model for different values of PIP calculated from measured wellbore parameters measured during the first time interval. The processor 152 may also train the first machine learning model for different values of intake loss calculated from measured wellbore parameters measured during the first time interval. Additionally, the processor 152 may train the first machine learning model for each of the directly measured wellbore parameters within the selected group of wellbore variables $(Y_n)$ (such as motor frequency, motor current, motor temperature, etc.). Example embodiments may use any type of machine learning model (such as a linear regression model, a logistic regression model, a decision tree model, a random forest model, a support vector machine model, a naive bayes model, a k-nearest neighbors model, a neural networks model, gradient boosting machines model, a hidden Markov model, etc.).

At block 208, the first trained machine learning model is fitted for each selected wellbore variables $(Y_n)$ for the first time interval that includes the first group of training data values for the selected wellbore variables $(Y_n)$ that were detected or calculated in the first time interval. For example, with reference to FIG. 1, the processor 152 may perform the fitting of the first trained machine learning model for each selected wellbore variable $(Y_n)$ for the first time interval using one or more different fitting processes. For instance, the processor 152 may perform the fitting process using domain knowledge (physical understanding of the wellbore operation). The processor 152 may also perform the fitting using a filter method (evaluate individual or multi-way (e.g., 2, 3, etc.) interaction factor with the target response Y). In some implementations, the processor 152 may perform the fitting using a wrapper method using a searching algorithm to find the best subset with target variable Y. For example, the searching algorithm may include forward, backward, bidirectional, recursive feature elimination, exhaustive feature selection, multiple factor analysis (MFA), etc. In some implementations, the processor 152 may perform the fitting using a co-linear variance removal to remove a variable with a high linear. In some implementations, the processor 152 may perform the fitting using a training penalty (such as least absolute shrinkage and selection operator (LASSO), ridge regression, etc.).

At block 210, the first trained machine learning model is validated for each selected wellbore variable $(Y_n)$ for the first time interval with data values detected or calculated in the first time interval but not used for training of the first machine learning model. For example, with reference to FIG. 1, the processor 152 may validate the first trained machine learning model using data values for the wellbore variables $(Y_n)$ collected in the first time interval that was not used to train the first machine learning model. For instance, 50% of the data values for the wellbore variables $(Y_n)$ detected or calculated in the first time interval may be used for training the first machine learning model, and the other 50% of the data values for the wellbore variables $(Y_n)$ detected or calculated in the first time interval may be used for validating the first machine learning model. In some implementations, the processor 152 may validate the first trained machine learning model using test data mean square error (MSE). In some implementations, the processor 152 may validate the first trained machine learning model using adjusted R-squared $(R^2)$. Adjusted R $(R^2)$ may take into account the number of predictors (features) in the model and adjust the R-squared value to penalize overfitting. In some implementations, the processor 152 may validate using an Akaike information criterion (AIC). In some implementations, the processor may validate using Bayesian information Criterion (BIC), also known as Schwarz criterion. BIC is similar to AIC but may incorporate a stronger penalty for model complexity.

At block 212, a determination is made of whether the first trained machine learning model is validated for each of the selected wellbore variables $(Y_n)$. For example, with reference to FIG. 1, the processor 152 may make this determination. If the first trained machine learning model is not validated, operations of the flowchart 200 return to block 206 to train the first machine learning model again. Otherwise, operations of the flowchart 200 continue at block 214.

At block 214, the first trained machine learning model for the first time interval is stored and implemented for the wellbore operation. For example, with reference to FIG. 1, the processor 152 may store the first trained machine learning model in some type of machine-readable medium to be subsequently implemented for determining whether actual changes in a wellbore variable have occurred (and possibly the root cause) for the wellbore operation.

At block 216, a second time interval is selected to train and fit a second machine learning model with a second group of data values for the selected wellbore variables $(Y_n)$ that were detected in the second time interval. For example, with reference to FIG. 1, the processor 152 may make this selection. The second time interval is different from the first time interval. Similar to the first time interval, the second time interval may be any time range in which the wellbore operation is running. For instance, the first time interval may be a day, a week, a month, a quarter, a year, etc. The second time interval may include data values for the selected wellbore variables $Y_n$ and data values for other wellbore variables. Accordingly, the processor may clean or filter all of the data values for the second time interval to include a subset of the data values associated with the selected variables $Y_n$.

Operations of the flowchart 200 continue at transition point A, which continues at transition point A of the flowchart 300. Operations of the flowchart 300 start at transition point A, which continues at block 302.

At block 302, a second machine learning model is trained for each selected wellbore variable $(Y_n)$ for the second time interval that includes a second group of training data values for the selected wellbore variables $(Y_n)$ detected or calculated in the second time interval. For example, with reference to FIG. 1, the processor 152 may train a machine learning model for each selected wellbore variable $(Y_n)$ for the second time interval using a second group of training data values for the selected wellbore variable $(Y_n)$ that were measured or calculated for the first time interval of the wellbore operation using Equation 1 provided above.

For example, the processor 152 may train the machine learning model for different values of TDH calculated from measured wellbore parameters measured during the second time interval. The processor 152 may also train the machine learning model for different values of PIP calculated from measured wellbore parameters measured during the second time interval. The processor 152 may also train the machine learning model for different values of intake loss calculated from measured wellbore parameters measured during the second time interval. Additionally, the processor 152 may train the machine learning model for each of the directly measured wellbore parameters within the selected group of wellbore variables $(Y_n)$ (such as motor frequency, motor current, motor temperature, etc.). Example embodiments may use any type of machine learning model (such as the examples described above for the first machine learning model).

At block 304, the second trained machine learning model is fitted for each selected wellbore variable $(Y_n)$ for the second time interval that includes the second group of training data values for the selected wellbore variables $(Y_n)$ that were detected or calculated in the second time interval. For example, the processor 152 may perform the fitting of the second trained machine learning model for each selected wellbore variable $(Y_n)$ for the second time interval using one or more different fitting processes. For instance, the processor 152 may perform the fitting process using domain knowledge (physical understanding of the wellbore operation). The processor 152 may also perform the fitting using a filter method (evaluate individual or multi-way (e.g., 2, 3, etc.) interaction factor with the target response Y). In some implementations, the processor 152 may perform the fitting using a wrapper method using a searching algorithm to find the best subset with target variable Y. For example, the searching algorithm may include forward, backward, bidirectional, recursive feature elimination, exhaustive feature selection, multiple factor analysis (MFA), etc. In some implementations, the processor 152 may perform the fitting using a co-linear variance removal to remove a variable with a high linear. In some implementations, the processor 152 may perform the fitting using a training penalty (such as least absolute shrinkage and selection operator (LASSO), ridge regression, etc.).

At block 306, the second trained machine learning model is validated for each selected wellbore variable $(Y_n)$ for the second time interval with data values detected or calculated in the second time interval but not used for training of the second machine learning model. For example, the processor 152 may validate the second trained machine learning model using data values for the selected wellbore variables $(Y_n)$ collected in the second time interval that was not used to train the second machine learning model. For instance, 50% of the data values for the selected wellbore variables $(Y_n)$ detected or calculated in the second time interval may be used for training the second machine learning model, and the other 50% of the data values for the selected wellbore variables $(Y_n)$ detected or calculated in the second time interval may be used for validating the second machine learning model. In some implementations, the processor 152 may validate the second trained machine learning model using test data mean square error (MSE). In some implementations, the processor 152 may validate the second trained machine learning model using adjusted R-squared $(R^2)$. Adjusted R $(R^2)$ may take into account the number of predictors (features) in the model and adjust the R-squared value to penalize overfitting. In some implementations, the processor 152 may validate using an Akaike information criterion (AIC). In some implementations, the processor 152 may validate using Bayesian information Criterion (BIC), also known as Schwarz criterion. BIC is similar to AIC but may incorporate a stronger penalty for model complexity.

At block 308, a determination is made of whether the second trained machine learning model is validated for each of the selected wellbore variables $(Y_n)$. For example, the processor 152 may make this determination. If the second trained machine learning model is not validated, operations of the flowchart 200 return to block 206 to train the second machine learning model again. Otherwise, operations of the flowchart 200 continue at block 214.

At block 310, the second trained machine learning model for the second time interval is stored and implemented for the wellbore operation. For example, the processor 152 may store the second trained machine learning model in some type of machine-readable medium to be subsequently implemented for determining whether actual changes in a wellbore variable have occurred (and possibly the root cause) for the wellbore operation.

At block 312, data samples of the selected wellbore variables ($Y_n$) are extracted from a third time interval. For example, with reference to FIG. 1 the processor 152 may extract these data samples from the third time interval. These extracted data samples may be samples of the selected wellbore variables ($Y_n$) and used to determine if at least one selected variable ($Y_n$) has changed between the first time interval and the second time interval. In some implementations, the third time interval may be after the first and second time intervals.

At block 314, the extracted samples for each of the selected wellbore variables ($Y_n$) are applied to the first trained machine learning model and the second trained machine learning model. For example, with reference to FIG. 1 the processor 152 may apply each of these extracted samples to the first trained model to output a first trained model response for each of these extracted samples for each of the selected wellbore variables ($Y_n$). In some implementations, these extracted samples may be samples pulled from real-time or pre-defined data. For example, once both machine learning models are ready, a pre-defined flow rate (e.g., 500 bpd, 1000 bpd, 8000 bpd, etc.) may be input for both machine learning models. The processor 152 may apply each of these extracted samples to the second trained model to output a second trained model response for each of these extracted samples for each of the selected wellbore variables ($Y_n$).

Operations of the flowchart 300 continue at transition point B, which continues at transition point B of the flowchart 400. Operations of the flowchart 400 start at transition point B, which continues at block 402.

At block 402, a paired random block design analysis is executed for each selected wellbore variable ($Y_n$) across the extracted samples. For example, with reference to FIG. 1 the processor 152 may perform this operation to compare the model response for the first trained machine learning model to the model response for the second trained machine learning model for each of these extracted samples. While described as using paired random block design analysis to compare two sets of data, other types of operations may be performed for the comparison. In this example, the operation is used to compare the first trained machine learning model response to the second trained machine learning model response for a given input. Paired random block design analysis is a statistical method used to analyze these responses that involve paired observations and a blocking factor. This analysis may allow for control of variability caused by certain factors that cannot be controlled or eliminated completely. Thus, some implementations may use a paired random block design analysis as a statistical method that incorporates paired observations and a blocking factor to control for variability and compare treatment groups or conditions.

Figure 6:
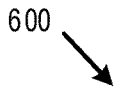
FIG. 6 is a chart of example of paired random block analysis for a wellbore variable $Y_n$, according to some embodiments.

To illustrate, FIG. 6 is a chart of example of paired random block design analysis for a wellbore variable $Y_n$, according to some embodiments. A chart 600 of FIG. 6 includes four columns—1) a sample column 602, 2) a column 604 for a first trained machine learning model response for $Y_n$, 3) a column 606 for a second trained machine learning model response for $Y_n$, and 4) and a difference column 608. The difference column 608 may include a result of the comparison between the two model responses. In other words, the difference column 608 may be a result of the paired random block analysis.

The sample column 602 includes four data samples—1, 2, 3, and 4. For the first data sample (1), the column 604 has a value of 5; the column 606 has a value of 4; and the column 608 has a value of 1. In particular, for the first data sample (1), the first trained machine learning model outputs a response for $Y_n$ of 5. For the first data sample (1), the second trained machine learning model outputs a response for $Y_n$ of 4. Therefore, the difference column 608 includes a result of the comparison (the result of the paired random block design analysis)—which is the difference between the two model output responses–1. For the second data sample (2), the first trained machine learning model outputs a response for $Y_n$ of 6. For the second data sample (2), the second trained machine learning model outputs a response for $Y_n$ of 2. Therefore, the difference column 608 includes the difference between the two model output responses—4. For the third data sample (3), the first trained machine learning model outputs a response for $Y_n$ of 7. For the third data sample (3), the second trained machine learning model outputs a response for $Y_n$ of 5. Therefore, the difference column 608 includes the difference between the two model output responses—2. For the fourth data sample (4), the first trained machine learning model outputs a response for $Y_n$ of 8. For the fourth data sample (4), the second trained machine learning model outputs a response for $Y_n$ of 5. Therefore, the difference column 608 includes the difference between the two model output responses—3.

Returning to operations of the flowchart 400 of FIG. 4, operations continue at block 404.

At block 404, a t-test is performed on each paired block design to determine a difference between each pair. For example, with reference to FIG. 1, the processor 152 may perform this operation. The t-test for paired random block design analysis is a statistical test used to compare the means of two related data sets when the data is organized in a paired or blocked structure. The t-test for paired random block design analysis may evaluate whether there is a significant difference in the means of the two sets of differences. The test may be based on the differences between the paired model output responses within each block. In some implementations, the t-test is calculated based on Equation (2):

$$tpaired = \sqrt{N}\left(\frac{\bar{d}}{Sd}\right) \qquad \text{(Eq. 2)}$$

where $t_{paired}$ is a result of the t-test, $\bar{d}$ is the mean, $S_d$ is the variance and N is the number of samples. Operations at blocks 402-404 described using paired random block design analysis and t-test for statistically comparing the differences between two or multiple sets of data. However, example implementations may use any other types of operations for perform this statistical comparing.

At block 406, a probability level (X) is selected. For example, with reference to FIG. 1, the processor 152 may perform this selection. The probability level can also be defined as a confidence level of the trained machine learning models. The probability level may vary depending on a number of factors (such as the type of application, wellbore operation, etc.). Examples of the probability level may be 0.05%, 5%, etc.

At block 408, a determination is made of whether any identified selected wellbore variables ($Y_n$) changed from the first time interval and the second time interval based on the t-test between each pair and the selected probability level (X). For example, with reference to FIG. 1 the processor 152 may perform this determination. In some implementations, an identified selected wellbore variable ($Y_n$) may not be considered "changed" if there is just a change in a user set operating condition (such as a change in the frequency of a motor). Rather, an identified selected wellbore variable ($Y_n$) may be considered "changed" if the change is a result of degradation or a fault in the equipment of the wellbore operation. For example, an identified selected wellbore variable ($Y_n$) may be considered "changed" because the change was a result of scale build up in the pump (resulting in a temperature increase of the motor beyond an acceptable threshold range). Thus, in some implementations, an identified selected wellbore variable ($Y_n$) has changed between the first time interval and the second time interval if the change is from equipment degradation or fault and not just a result of a change in an operating condition (such as a change in frequency of the motor). Accordingly, an identified selected wellbore variable ($Y_n$) is considered "changed" (greater than a change threshold) based on the t-test and the selected probability level (X). If no identified selected wellbore variables ($Y_n$) changed from the first time interval and the second time interval, operations of the flowchart 400 continue at transition point C, which continues at transition point C of the flowchart 500, which completes operations of the flowcharts 200-500. If at least one identified selected wellbore variable ($Y_n$) changed from the first time interval and the second time interval, operations of the flowchart 400 continue at block 410.

At block 410, an alarm or notification is output for each identified selected wellbore variable ($Y_n$) that has changed between the first time interval and the second time interval. For example, with reference to FIG. 1 the processor 152 may perform this operation.

At block 412, a determination is made of whether more than one identified selected wellbore variable ($Y_n$) has changed between the first time interval and the second time interval. For example, with reference to FIG. 1 the processor 152 may make this determination. If there is more than one identified selected wellbore variable ($Y_n$) has changed between the first time interval and the second time interval, operations of the flowchart 400 continue at block 414. Otherwise, operations of the flowchart 400 continue at transition point D.

At block 414, a root cause is identified based on common factors among the identified selected wellbore variables ($Y_n$). For example, with reference to FIG. 1 the processor 152 may perform this operation. For instance, the identified selected wellbore variable ($Y_n$) may be a calculated value (such as TDH, PIP, intake loss, etc.) that is calculated based on multiple wellbore parameters. Some implementations may identify which of these multiple wellbore parameters are mostly ones causing the change from the first time interval to the second interval (the root cause). To illustrate, assume there were two identified selected wellbore variables—$Y_1$ and $Y_4$ that are a function of the following measured wellbore parameters (see Equations 3-4):

$$Y_1 = f(P_1, P_3, P_4) \qquad \text{(Eq 3)}$$

-continued
$$Y_4 = f(P_2, P_4, P_5) \qquad \text{(Eq 4)}$$

Thus, the common factor between $Y_1$ and $Y_4$ is $P_4$—the shared measured wellbore parameter. Accordingly, the root cause may include the shared measured wellbore parameter ($P_4$). Examples of the shared measured wellbore parameter may include motor frequency, motor temperature, motor current, etc.

Operations of the flowchart 400 continue at transition point D, which continues at transition point D of the flowchart 500. Operations of the flowchart 500 start at transition point D, which continues at block 502.

At block 502, a determination is made of whether a wellbore operation is to be updated based on the identified selected wellbore variables ($Y_n$) and the root cause. For example, the processor 152 may make this determination. For instance, the processor 152 may determine that a wellbore parameter (such as frequency of the motor, voltage of the motor, current of the motor, etc.) for an ESP wellbore operation needs to be adjusted. The updates may be to operations at the surface of the wellbore and/or downhole. In some implementations, another update to a wellbore operation may be adjusts in the chemical treatment of the fluid that is flowing in the wellbore. If it is determined that there is scale build up in the pump for an ESP operation, an update to the wellbore operation is to perform an acid cleaning operation to remove or reduce the scale build up. Such updates may allow for modifications of the wellbore operation to enable better performance and/or subsequent equipment failure. In other examples, the processor 152 may determine that parts and/or equipment for the wellbore operation need to be replaced because these parts and/or equipment or broken and/or degraded to a point that replacement is needed. For example, current leakage of a motor for an ESP operation may be monitored. If the current leakage difference between the two time intervals is beyond an acceptable range, an update to the wellbore operation may include a planned replacement and/or repair of the motor. If a wellbore operation is to be updated, operations of the flowchart 500 continue at block 504. Otherwise, operations of the flowchart 500 are complete.

At block 504, a wellbore operation is updated. For example, the processor 152 may perform the update. For example, the processor 152 may make the update itself (by adjusting wellbore parameters), transmit instructions to make the update, transmit notifications that an update is needed, etc. Operations of the flowcharts 200-500 are complete.

Example Computer

Figure 7:
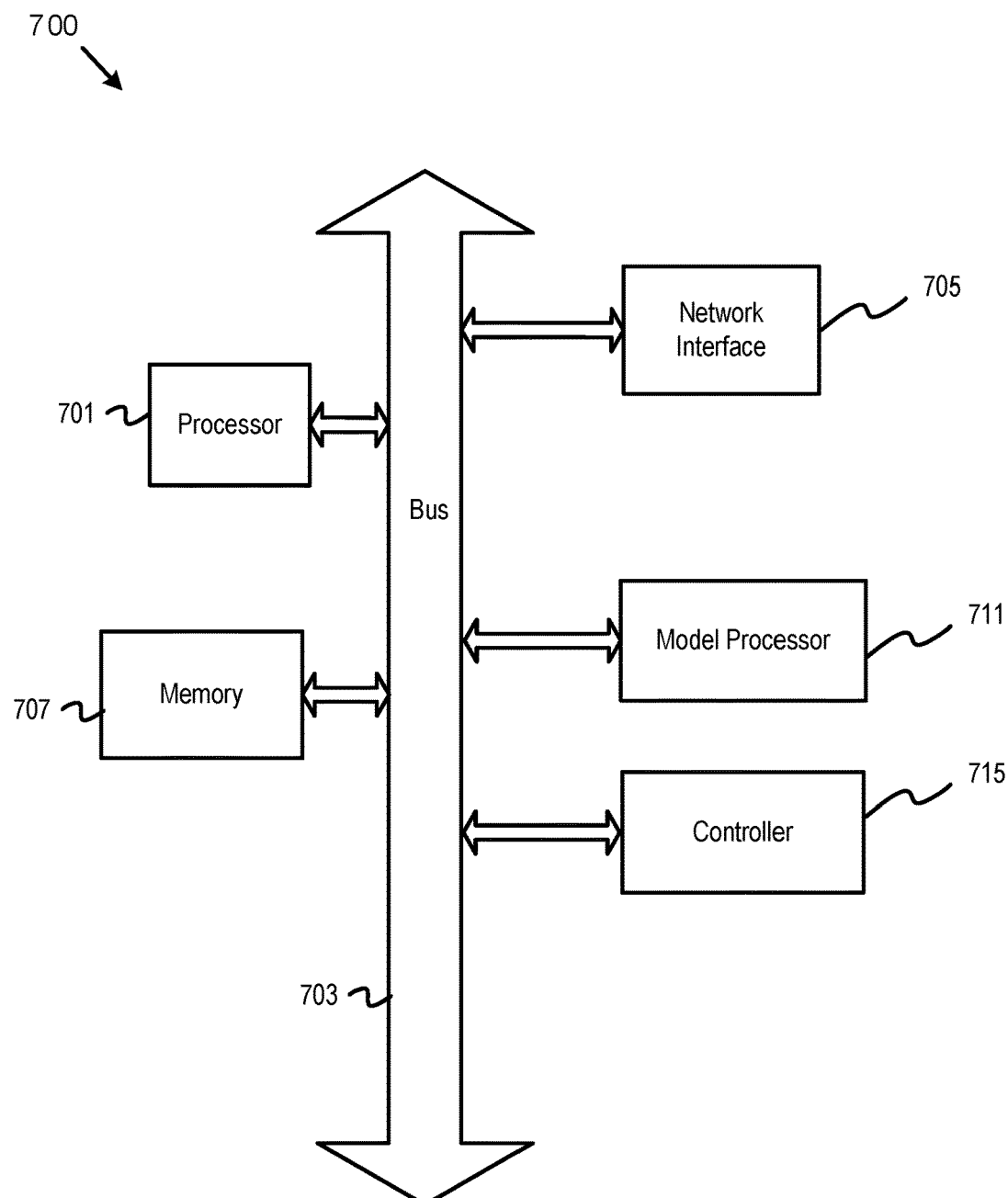
FIG. 7 is a block diagram of an example computer, according to some embodiments.

FIG. 7 is a block diagram of an example computer, according to some embodiments. In FIG. 7, a computer 700 that includes a processor 701 (possibly including multiple processors, multiple cores, multiple nodes, and/or implementing multi-threading, etc.). The computer 700 includes a memory 707. The memory 707 may be system memory or any one or more of the above already described possible realizations of machine-readable media. The computer 700 also includes a bus 703 and a network interface 705.

The computer 700 also includes a model processor 711 and a controller 715. The model processor 711 and the controller 715 may perform one or more of the operations described herein. For example, the model processor 711 may perform operations to train machine learning models and detection of actual changes in wellbore variables (and possibly a root clause) using the trained machine learning models (as described above). The controller 715 may perform various control operations to a wellbore operation based on the actual changes in wellbore variables (and possible the root cause). For example, the controller 715 may modify a wellbore operation.

Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for simulating drill bit abrasive wear and damage during the drilling of a wellbore as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Embodiment #1: A method comprising: selecting at least one wellbore variable of a wellbore operation; for each of two or more machine learning models, training each respective machine learning model with a respective set of training data values of the at least one wellbore variable detected in a respective different time interval; and for each of the two or more machine learning models, processing, for each of the at least one wellbore variable, a set of data samples of the respective at least one wellbore variable using each of the two or more trained machine learning models to output a respective model output response for each data sample of a set of data samples.

Embodiment #2: The method of Embodiment #1, wherein the training each respective machine learning model includes training a first machine learning model for each of the at least one wellbore variable with a first set of training data values of the at least one wellbore variable detected in a first time interval; and training a second machine learning model for each of the at least one wellbore variable with a second set of train data values of the at least one wellbore variable detected in a second time interval; and wherein the processing the set of data samples includes processing, for each of the at least one wellbore variable, a set of data samples for the at least one wellbore variable using the first trained machine learning model to output a first model output response for each data sample of a set of data samples; and processing, for each of the at least one wellbore variable, the set of data samples for the at least one wellbore variable using the second trained machine learning model to output a second model output response for each data sample of the set of data samples.

Embodiment #3: The method of Embodiment #2, further comprising: detecting that the at least one wellbore variable has changed between the first time interval and the second time interval based on a difference between the first model output response and the second model output response.

Embodiment #4: The method of any one of Embodiments #2-3, further comprising determining that at least one of the following has occurred, equipment that is still operational and part of the wellbore operation has degraded beyond a degradable threshold based on detecting that the at least one wellbore variable has changed, or determining that an event has occurred in the wellbore operation using a signature pattern for the event based on detecting that the at least one wellbore variable has changed.

Embodiment #5: The method of any one of Embodiments #4-5, wherein detecting that the at least one wellbore variable has changed comprises detecting that the at least one wellbore variable has changed in response the difference between the first model output response and the second model output response being beyond a change range.

Embodiment #6: The method of any one of Embodiments #2-5, further comprising: determining the difference between the first model output response and the second model output response.

Embodiment #7: The method of Embodiment #6, further comprising: statistically comparing the difference between the first model output response and the second model output response.

Embodiment #8: The method of Embodiment #7, wherein statistically comparing the difference comprises, performing a paired random block design analysis for a pair of the first model output response and the second model output response for each data sample; and performing a paired t-test for each pair of the paired block design analysis.

Embodiment #9: The method of any one of Embodiments #7-8, further comprising: identifying which of the at least one wellbore variable has changed between the first time interval and the second time interval based on the statistically comparing.

Embodiment #10: The method of Embodiment #9, wherein identifying which of the at least one wellbore variable has changed between the first time interval and the second time interval is based on a probability level of accuracy of the first trained machine learning model and the second trained machine learning model.

Embodiment #11: The method of any one of Embodiments #2-10, further comprising: determining whether more than one of the at least one wellbore variable has changed between the first time interval and the second time interval; and in response to determining that more than one of the at least one wellbore variable has changed between the first time interval and the second time interval, determining whether there is at least one wellbore parameter common among the at least one wellbore variable; and identifying the at least one wellbore parameter as a root cause of the change between the first time interval and the second time interval.

Embodiment #12: The method of any one of Embodiments #3-11 further comprising modifying the wellbore operation based on detecting that the at least one wellbore variable has changed.

Embodiment #13: The method of any one of Embodiments #2-12, further comprising: training wellbore parameters using at least one of the first or second machine learning models based on real time data from a number of sensors at the wellbore operation; in response to at least one sensor of the number of sensors failing in the wellbore operation, filling in the data from the at least one failed sensor using the associated trained wellbore parameters; and creating a hybrid monitoring system for the wellbore operation using the real time data from the number of sensors and the trained wellbore parameters generated from the at least one of the first or second machine learning models.

Embodiment #14: A non-transitory, computer-readable medium having instructions stored thereon that are executable by a processor, the instructions comprising: instructions to select at least one wellbore variable of a wellbore operation; for each of two or more machine learning models, instructions to train each respective machine learning model with a respective set of training data values of the at least one wellbore variable detected in a respective different time interval; and for each of the two or more machine learning models, instructions to process, for each of the at least one wellbore variable, a set of data samples of the respective at least one wellbore variable using each of the two or more trained machine learning models to output a respective model output response for each data sample of a set of data samples.

Embodiment #15: The non-transitory, computer-readable medium of Embodiment #14, wherein the instructions to train each respective machine learning model includes instructions to train a first machine learning model for each of the at least one wellbore variable with a first set of training data values of the at least one wellbore variable detected in a first time interval; and instructions to train a second machine learning model for each of the at least one wellbore variable with a second set of train data values of the at least one wellbore variable detected in a second time interval; and wherein the instructions to process the set of data samples includes instructions to process, for each of the at least one wellbore variable, a set of data samples for the at least one wellbore variable using the first trained machine learning model to output a first model output response for each data sample of a set of data samples; and instructions to process, for each of the at least one wellbore variable, the set of data samples for the at least one wellbore variable using the second trained machine learning model to output a second model output response for each data sample of the set of data samples.

Embodiment #16: The non-transitory, computer-readable medium of Embodiment #15, wherein the instructions comprise instructions to instructions to detect that the at least one wellbore variable has changed between the first time interval and the second time interval based on a difference between the first model output response and the second model output response.

Embodiment #17: The non-transitory, computer-readable medium of Embodiment #16, wherein the instructions comprise instructions to determine that equipment that is still operational and part of the wellbore operation has degraded beyond a degradable threshold based on detecting that the at least one wellbore variable has changed.

Embodiment #18: The non-transitory, computer-readable medium of any one of Embodiments #16-17, wherein the instructions to detect that the at least one wellbore variable has changed comprises instructions to detect that the at least one wellbore variable has changed in response the difference between the first model output response and the second model output response being beyond a change range.

Embodiment #19: The non-transitory, computer-readable medium of any one of Embodiments #15-18, wherein the instructions comprise, instructions to determine the difference between the first model output response and the second model output response; instructions to statistically compare the difference between the first model output response and the second model output response; and instructions to identify which of the at least one wellbore variable has changed between the first time interval and the second time interval based on the statistically comparing.

Embodiment #20: The non-transitory, computer-readable medium of any one of Embodiments #15-19, wherein the instructions comprise, instructions to determine whether more than one of the at least one wellbore variable has changed between the first time interval and the second time interval; and in response to determining that more than one of the at least one wellbore variable has changed between the first time interval and the second time interval, instructions to determine whether there is at least one wellbore parameter common among the at least one wellbore variable; and instructions to identify the at least one wellbore parameter as a root cause of the change between the first time interval and the second time interval.

Embodiment #21: The non-transitory, computer-readable medium of any one of Embodiments #16-20, wherein the instructions comprise instructions to modify the wellbore operation based on detecting that the at least one wellbore variable has changed.

Embodiment #22: A wellbore system comprising: at least one sensor to be positioned at the surface of a wellbore and downhole in the wellbore; a processor; and a computer-readable medium having instructions stored thereon that are executable by the processor to cause the processor to, select at least one wellbore variable of a wellbore operation; for each of two or more machine learning models, train each respective machine learning model with a respective set of training data values of the at least one wellbore variable detected in a respective different time interval; and for each of the two or more machine learning models, process, for each of the at least one wellbore variable, a set of data samples of the respective at least one wellbore variable using each of the two or more trained machine learning models to output a respective model output response for each data sample of a set of data samples.

Embodiment #23: The wellbore system of Embodiment #22, wherein the instructions to cause the processor to train each respective machine learning model include instructions to cause the processor to train a first machine learning model for each of the at least one wellbore variable with a first set of training data values of the at least one wellbore variable detected in a first time interval; and instructions to cause the processor to train a second machine learning model for each of the at least one wellbore variable with a second set of train data values of the at least one wellbore variable detected in a second time interval; and wherein the instructions to cause the processor to process the set of data samples include instructions to cause the processor to process, for each of the at least one wellbore variable, a set of data samples for the at least one wellbore variable using the first trained machine learning model to output a first model output response for each data sample of a set of data samples; and instructions to cause the processor to process, for each of the at least one wellbore variable, the set of data samples for the at least one wellbore variable using the second trained machine learning model to output a second model output response for each data sample of the set of data samples.

Embodiment #24: The wellbore system of Embodiment #23, wherein the instructions comprise instructions executable by the processor to cause the processor to detect that the at least one wellbore variable has changed between the first time interval and the second time interval based on a difference between the first model output response and the second model output response.

Embodiment #25: The wellbore system of Embodiment #24, wherein the instructions comprise instructions executable by the processor to cause the processor to determine that equipment that is still operational and part of the wellbore operation has degraded beyond a degradable threshold based on detection that the at least one wellbore variable has changed.

Embodiment #26: The wellbore system of any one of Embodiments #23-25, wherein the instructions comprise instructions executable by the processor to cause the processor to determine the difference between the first model output response and the second model output response; statistically compare the difference between the first model output response and the second model output response; and identify which of the at least one wellbore variable has changed between the first time interval and the second time interval based on the statistically comparison.

Embodiment #27: The wellbore system of any one of Embodiments #23-26, wherein the instructions comprise instructions executable by the processor to cause the processor to, determine whether more than one of the at least one wellbore variable has changed between the first time interval and the second time interval; and in response to determining that more than one of the at least one wellbore variable has changed between the first time interval and the second time interval, determine whether there is at least one wellbore parameter common among the at least one wellbore variable; and identify the at least one wellbore parameter as a root cause of the change between the first time interval and the second time interval.

Embodiment #28: The wellbore system of any one of Embodiments #24-27, wherein the instructions comprise instructions executable by the processor to cause the processor to modify the wellbore operation based on detection that the at least one wellbore variable has changed.

The invention claimed is:

1. A method comprising:
   selecting at least one wellbore variable of a wellbore operation;
   for each of two or more machine learning models, training, via a processor, each respective machine learning model with a respective set of training data values of the at least one wellbore variable detected in a respective different time interval;
   for each of the two or more machine learning models, processing, via the processor, for each of the at least one wellbore variables, a set of data samples of the respective at least one wellbore variable using each of the two or more trained machine learning models to output a respective model output response for each data sample of the set of data samples;
   identifying a change in the wellbore operation, wherein identifying includes comparing the model output responses from two or more of the trained machine learning models; and
   modifying the wellbore operation based on the identified change.

2. The method of claim 1, wherein the training each respective machine learning model includes
   training a first machine learning model for each of the at least one wellbore variables with a first set of training data values of the at least one wellbore variable detected in a first time interval; and
   training a second machine learning model for each of the at least one wellbore variables with a second set of training data values of the at least one wellbore variable detected in a second time interval;
   and wherein the processing the set of data samples includes
   processing, for each of the at least one wellbore variables, a set of data samples for the at least one wellbore variable using the first trained machine learning model to output a first model output response for each data sample of a set of data samples; and
   processing, for each of the at least one wellbore variables, the set of data samples for the at least one wellbore variable using the second trained machine learning model to output a second model output response for each data sample of the set of data samples.

3. The method of claim 2, wherein identifying a change further includes:
   detecting that the at least one wellbore variable has changed between the first time interval and the second time interval based on a difference between the first model output response and the second model output response.

4. The method of claim 3, further comprising modifying the wellbore operation based on detecting that the at least one wellbore variable has changed.

5. The method of claim 3, further comprising determining that at least one of the following has occurred, equipment that is still operational and part of the wellbore operation has degraded beyond a degradable threshold based on detecting that the at least one wellbore variable has changed, or determining that an event has occurred in the wellbore operation using a signature pattern for the event based on detecting that the at least one wellbore variable has changed.

6. The method of claim 3, wherein detecting that the at least one wellbore variable has changed comprises detecting that the at least one wellbore variable has changed in response the difference between the first model output response and the second model output response being beyond a change range.

7. The method of claim 2, further comprising:

determining the difference between the first model output response and the second model output response.

8. The method of claim 7, further comprising:

statistically comparing the difference between the first model output response and the second model output response.

9. The method of claim 8, wherein statistically comparing the difference comprises, performing a paired random block design analysis for a pair of the first model output response and the second model output response for each data sample; and performing a paired t-test for each pair of the paired block design analysis.

10. The method of claim 8, further comprising:

identifying which of the wellbore variables has changed between the first time interval and the second time interval based on the statistically comparing.

11. The method of claim 10, wherein identifying which of the wellbore variables has changed between the first time interval and the second time interval is based on a probability level of accuracy of the first trained machine learning model and the second trained machine learning model.

12. The method of claim 2, further comprising:

determining whether more than one of the at least one wellbore variables has changed between the first time interval and the second time interval; and in response to determining that more than one of the at least one wellbore variables has changed between the first time interval and the second time interval, determining whether there is at least one wellbore parameter common among the at least one wellbore variables; and identifying the at least one wellbore parameter as a root cause of the change between the first time interval and the second time interval.

13. The method of claim 2, further comprising:

training wellbore parameters using at least one of the first or second machine learning models based on real time data from a number of sensors at the wellbore operation;

in response to at least one sensor of the number of sensors failing in the wellbore operation, filling in the data from the at least one failed sensor using the associated trained wellbore parameters; and creating a hybrid monitoring system for the wellbore operation using the real time data from the number of sensors and the trained wellbore parameters generated from the at least one of the first or second machine learning models.

14. A non-transitory, computer-readable medium having instructions stored thereon that are executable by a processor, the instructions comprising:

instructions to select at least one wellbore variable of a wellbore operation;

for each of two or more machine learning models, instructions to train each respective machine learning model with a respective set of training data values of the at least one wellbore variable detected in a respective different time interval;

for each of the two or more machine learning models, instructions to process, for each of the at least one wellbore variables, a set of data samples of the respective at least one wellbore variable using each of the two or more trained machine learning models to output a respective model output response for each data sample of a set of data samples;

instructions to identify a change in the wellbore operation, wherein identifying includes comparing the model output responses from two or more of the trained machine learning models; and instructions to modify the wellbore operation based on the identified change.

15. The non-transitory, computer-readable medium of claim 14, wherein the instructions to train each respective machine learning model includes instructions to train a first machine learning model for each of the at least one wellbore variables with a first set of training data values of the at least one wellbore variable detected in a first time interval; and instructions to train a second machine learning model for each of the at least one wellbore variables with a second set of train data values of the at least one wellbore variable detected in a second time interval;

and wherein the instructions to process the set of data samples includes instructions to process, for each of the at least one wellbore variables, a set of data samples for the at least one wellbore variable using the first trained machine learning model to output a first model output response for each data sample of a set of data samples; and instructions to process, for each of the at least one wellbore variables, the set of data samples for the at least one wellbore variable using the second trained machine learning model to output a second model output response for each data sample of the set of data samples.

16. The non-transitory, computer-readable medium of claim 15, wherein the instructions comprise instructions to detect that the at least one wellbore variable has changed between the first time interval and the second time interval based on a difference between the first model output response and the second model output response.

17. The non-transitory, computer-readable medium of claim 16, wherein the instructions comprise instructions to modify the wellbore operation based on detecting that the at least one wellbore variable has changed.

18. The non-transitory, computer-readable medium of claim 16, wherein the instructions comprise instructions to determine that equipment that is still operational and part of the wellbore operation has degraded beyond a degradable threshold based on detecting that the at least one wellbore variable has changed.

19. The non-transitory, computer-readable medium of claim 16, wherein the instructions to detect that the at least one wellbore variable has changed comprises instructions to detect that the at least one wellbore variable has changed in response the difference between the first model output response and the second model output response being beyond a change range.

20. The non-transitory, computer-readable medium of claim 15, wherein the instructions comprise, instructions to determine the difference between the first model output response and the second model output response;

instructions to statistically compare the difference between the first model output response and the second model output response; and instructions to identify which of the at least one wellbore variable has changed between the first time interval and the second time interval based on the statistically comparing.

21. The non-transitory, computer-readable medium of claim 15, wherein the instructions comprise, instructions to determine whether more than one of the at least one wellbore variables has changed between the first time interval and the second time interval; and in response to determining that more than one of the at least one wellbore variables has changed between the first time interval and the second time interval, instructions to determine whether there is at least one wellbore parameter common among the at least one wellbore variable; and instructions to identify the at least one wellbore parameter as a root cause of the change between the first time interval and the second time interval.

22. A wellbore system comprising:

at least one sensor to be positioned at the surface of a wellbore and downhole in the wellbore;

a processor; and a computer-readable medium having instructions stored thereon that are executable by the processor to cause the processor to, select at least one wellbore variable of a wellbore operation;

for each of two or more machine learning models, train, via the processor, each respective machine learning model with a respective set of training data values of the at least one wellbore variable detected in a respective different time interval;

for each of the two or more machine learning models, process, train, via the processor, for each of the at least one wellbore variables, a set of data samples of the respective at least one wellbore variable using each of the two or more trained machine learning models to output a respective model output response for identify a change in the wellbore operation, wherein identifying includes comparing the model output responses from two or more of the trained machine learning models; and modify the wellbore operation based on the identified change.

23. The wellbore system of claim 22, wherein the instructions to cause the processor to train each respective machine learning model include instructions to cause the processor to train a first machine learning model for each of the at least one wellbore variables with a first set of training data values of the at least one wellbore variable detected in a first time interval; and instructions to cause the processor to train a second machine learning model for each of the at least one wellbore variables with a second set of train data values of the at least one wellbore variable detected in a second time interval;

and wherein the instructions to cause the processor to process the set of data samples include instructions to cause the processor to process, for each of the at least one wellbore variables, a set of data samples for the at least one wellbore variable using the first trained machine learning model to output a first model output response for each data sample of a set of data samples; and instructions to cause the processor to process, for each of the at least one wellbore variables, the set of data samples for the at least one wellbore variable using the second trained machine learning model to output a second model output response for each data sample of the set of data samples.

24. The wellbore system of claim 23, wherein the instructions comprise instructions executable by the processor to cause the processor to detect that the at least one wellbore variable has changed between the first time interval and the second time interval based on a difference between the first model output response and the second model output response.

25. The wellbore system of claim 24, wherein the instructions comprise instructions executable by the processor to cause the processor to determine that equipment that is still operational and part of the wellbore operation has degraded beyond a degradable threshold based on detection that the at least one wellbore variable has changed.

26. The wellbore system of claim 24, wherein the instructions comprise instructions executable by the processor to cause the processor to modify the wellbore operation based on detection that the at least one wellbore variable has changed.

27. The wellbore system of claim 23, wherein the instructions comprise instructions executable by the processor to cause the processor to determine the difference between the first model output response and the second model output response;

statistically compare the difference between the first model output response and the second model output response; and identify which of the at least one wellbore variable has changed between the first time interval and the second time interval based on the statistically comparison.

28. The wellbore system of claim 23, wherein the instructions comprise instructions executable by the processor to cause the processor to, determine whether more than one of the at least one wellbore variables has changed between the first time interval and the second time interval; and in response to determining that more than one of the at least one wellbore variables has changed between the first time interval and the second time interval, determine whether there is at least one wellbore parameter common among the at least one wellbore variable; and identify the at least one wellbore parameter as a root cause of the change between the first time interval and the second time interval.

* * * * *